US009909322B1

(12) United States Patent
Sadleir (10) Patent No.: US 9,909,322 B1
(45) Date of Patent: Mar. 6, 2018

(54) SYSTEM AND METHOD FOR INSTALLING TILE

(71) Applicant: Gerald Sadleir, Orem, UT (US)

(72) Inventor: Gerald Sadleir, Orem, UT (US)

( * ) Notice: Subject to any disclaimer, the term of this patent is extended or adjusted under 35 U.S.C. 154(b) by 0 days.

(21) Appl. No.: 15/146,960

(22) Filed: May 5, 2016

Related U.S. Application Data

(63) Continuation-in-part of application No. 14/494,376, filed on Sep. 23, 2014, now Pat. No. 9,404,271.

(51) Int. Cl.
| | |
|---|---|
| *E04F 15/02* | (2006.01) |
| *E04F 21/04* | (2006.01) |
| *B28B 7/00* | (2006.01) |
| *C04B 28/04* | (2006.01) |
| *E04F 13/08* | (2006.01) |
| *E04F 13/14* | (2006.01) |
| *E04F 13/28* | (2006.01) |

(Continued)

(52) U.S. Cl.
CPC ............ *E04F 15/0215* (2013.01); *B28B 1/14* (2013.01); *B28B 7/007* (2013.01); *B28B 7/0064* (2013.01); *B29C 33/3842* (2013.01); *B29C 41/02* (2013.01); *C04B 28/04* (2013.01); *E04F 13/0873* (2013.01); *E04F 13/0885* (2013.01); *E04F 13/147* (2013.01); *E04F 13/28* (2013.01); *E04F 15/02022* (2013.01); *E04F 15/02044* (2013.01); *E04F 15/02183* (2013.01); *E04F 15/08* (2013.01); *E04F 21/023* (2013.01); *E04F 21/04* (2013.01); *B29K 2021/00* (2013.01); *B29K 2105/0058* (2013.01); *B29L 2031/757* (2013.01)

(58) Field of Classification Search
CPC . E04F 15/0215; E04F 13/0873; E04F 13/147; E04F 13/28; E04F 13/0885; E04F 15/02183; E04F 15/08; E04F 15/02044; E04F 21/023; E04F 21/04; E04F 15/02022; C04B 28/04; B28B 1/14; B28B 7/007; B28B 7/0064; B29C 41/02; B29C 33/3842; B29L 2031/75
See application file for complete search history.

(56) References Cited

U.S. PATENT DOCUMENTS

| | | | | |
|---|---|---|---|---|
| 4,397,125 A | * | 8/1983 | Gussler, Jr. ......... | E04F 21/0092 52/127.3 |
| 8,578,674 B2 | * | 11/2013 | Ross ..................... | E04F 21/185 52/126.7 |

(Continued)

*Primary Examiner* — Phi D A
*Assistant Examiner* — Omar F Hijaz
(74) *Attorney, Agent, or Firm* — Wright Law Group, PLLC; Mark E. Wright (57) ABSTRACT

A system and method for installing tile includes the use of fasteners and washers that are installed into the interstitial gaps of the tiles or installed through the face of the tile. The washers and fasteners create a downward pressure on the tiles to align the edges of the tiles and to ensure that the tiles conform to the surface to which they are applied, thereby significantly reducing or minimizing the occurrence of gaps or voids between the installation surface and the tiles. Once the tiles are fixed in position and the adhesive has set or cured, the washers and fasteners are removed and the interstitial spaces or gaps between the tiles is grouted and the tile can be painted or stained. Additionally, the method of manufacturing decorative concrete tiles uses flexible rubber molds to achieve a variety of unique shapes, patterns, and textures.

8 Claims, 6 Drawing Sheets

(51) Int. Cl.
   *E04F 15/08*       (2006.01)
   *E04F 21/02*       (2006.01)
   *B28B 1/14*        (2006.01)
   *B29C 41/02*       (2006.01)
   *B29C 33/38*       (2006.01)
   *B29K 21/00*       (2006.01)
   *B29K 105/00*      (2006.01)
   *B29L 31/00*       (2006.01)

(56) References Cited

U.S. PATENT DOCUMENTS

| | | | | |
|---|---|---|---|---|
| 2010/0005733 | A1* | 1/2010 | Anderson | B28B 7/0038 |
| | | | | 52/98 |
| 2013/0247508 | A1* | 9/2013 | Hoffman | E04F 21/00 |
| | | | | 52/749.11 |
| 2014/0033641 | A1* | 2/2014 | Trevisi | E04F 21/0092 |
| | | | | 52/749.1 |
| 2015/0211243 | A1* | 7/2015 | Irvine | E04F 21/0092 |
| | | | | 52/126.1 |

* cited by examiner

SYSTEM AND METHOD FOR INSTALLING TILE

BACKGROUND OF THE INVENTION

1. Technical Field

The present invention relates generally to the field of construction and more specifically relates to a system and method for using precast tiles in various applications.

2. Background Art

Concrete is a well-known building material and the use of concrete to construct buildings, roads, walkways, etc. is commonplace around the world. Concrete can be used for creating design elements as well as structural components. For example, decorative concrete elements are generally considered to be durable and flexible as far as style and size goes, allowing for significant creativity in the construction design and fabrication process. In many cases, while natural stone may be preferred, the cost of using natural stone may be prohibitive.

To address the limitations associated with creating decorative elements, "stamped concrete" may be used. Stamped concrete is concrete that is patterned, textured or embossed to resemble brick, slate, flagstone, stone, tile, wood, as well as various other patterns and textures. Stamped concrete is commonly used for patios, sidewalks, driveways, pool decks, and interior flooring. The ability of stamped concrete to resemble other building materials makes stamped concrete a less expensive alternative to using authentic materials such as When creating stamped concrete, a pattern is formed on the surface of a concrete slab by imprinting the concrete shortly after it has been poured with a "concrete stamp." Most modern concrete stamps are manufactured from polyurethane, but older "cookie cutter" style stamps were made of various metals. The old style stamps typically lacked the capabilities of forming natural stone texture and were more commonly used to create substantially angular geometric shapes.

While concrete stamping is a very popular process for creating decorative concrete features, its use is not without certain limitations. For example, to achieve a stamped concrete finish requires professional, skilled concrete workers with years of experience. The conventional method requires pouring a concrete slab approximately 4"-6" thick (or ¼" thick if pouring a concrete overlay over an existing slab), professionally troweling the surface, and then stamping it with the desired pattern or texture using the proper concrete tools and conventional rubber stamps. Skill, experience, and timing are critical to achieve a consistent texture and pattern. Using the previously known methods, it is difficult for even a trained professional to achieve a consistent texture over the entire surface of the slab.

On many jobs, it is common to find areas with relatively smooth spots where the concrete became too hard before it could be properly stamped or textured. Additionally, it can be quite expensive to purchase multiple concrete stamps in order to create the desired number of designs.

An additional problem with the installation of certain tiles is related to the relatively rigid nature of tiles, especially as the tiles increase in size. Because concrete and joint or seam is often less than "flush.' This can result in an uneven surface that is somewhat unsightly and may also present a tripping hazard. In order to avoid this problem, it is common to try and build up the lower edge of one tile to try and match the level of the neighboring tiles.

While this method can be somewhat successful, it can still be very difficult to get the edges of adjacent tiles to simultaneously match up on all corners. As one corner is built up, another corner will tend to rise or sink, causing yet additional misalignment. Since any misalignment is generally undesirable, the overall installation may suffer.

In addition to the edge alignment issues, it is not uncommon for the subsurface where tiles are to be installed to be somewhat uneven. This is particularly true in the case of exterior or outdoor installations such as driveways, patios, etc. and where relatively large tiles (e.g., 28" to 36") are used. Most existing tiles are relatively inflexible and brittle and cannot conform well to uneven surfaces. In those cases, a space, gap, or "void" between the subsurface and the tile will often be formed beneath the surface of the tile. This is a weak spot and may cause the tile to crack when weight is applied or allow water to enter the void and damage the tiles due to expansion and contraction in a freeze thaw cycle. Accordingly, without improvements in the process and techniques in creating tiles, texturing concrete, and properly installing tiles, the ability of the average homeowner or contractor to create high quality, smooth, decorative concrete surfaces will continue to be sub-optimal.

BRIEF SUMMARY OF THE INVENTION

A system and method for installing relatively flexible tiles includes the use of washers and fasteners. The method involves using washers and fasteners to hold tile in place until it is properly fixed in position. Additionally, the washers and fasteners can create a downward pressure on the tiles to help the tiles conform to the surface to which they are applied, thereby significantly reducing or minimizing the occurrence of gaps or voids between the surface and the tiles. Once the tiles are fixed in position, the washers and fasteners are removed and the tile is grouted.

Tiles may be formed from a textured mold with the desired surface appearance, generally mimicking the surface appearance of natural stone or other desired pattern. These cement tiles are most preferably in the range of ¼"-5/16" thick using a proprietary cementious mixture poured into molds. The proprietary admixture produces a cementitious tile that is considerably more flexible than existing tiles and provides for advantages during the installation process. The admixture used to form the tiles may be colored before it is poured into the form or it may be colored after the tiles have been installed and the concrete has set. After the desired number of concrete tiles have been formed, they may be positioned and fixed in place so as to cover the desired area and create the desired effect for the selected application.

BRIEF DESCRIPTION OF THE DRAWINGS

The various preferred embodiments of the present invention will hereinafter be described in conjunction with the appended drawings, wherein like designations denote like elements, and.

DETAILED DESCRIPTION

A system and method for installing tile includes the use of washers and fasteners. The method involves using washers and fasteners to hold tile in place until it is properly fixed in position. Additionally, the washers and fasteners create a downward pressure on the tiles to help the tiles conform to the surface to which they are applied, thereby significantly reducing or minimizing the occurrence of gaps or voids between the surface and the tiles. Once the tiles are fixed in position, the washers and fasteners are removed and the interstitial spaces or gaps between the tiles are filled with grout.

Additionally, according to at least one preferred embodiment of the present invention, a variety of tiles may formed from a textured mold with the desired surface appearance, generally mimicking the surface appearance of natural stone or other desired pattern. These cement tiles are most preferably in the range of 1/4"-5/16" thick using a proprietary cementitious mixture poured into molds. The admixture used to form the tiles may be colored before it is poured into the form or it may be colored after the concrete has set. After the desired number of tiles have been formed, they may be positioned and fixed in place so as to cover the desired area and create the desired effect for the selected application. If desired, the tiles may be painted, stained, or colored at this point in the process as well.

A system and method for creating custom concrete designs includes one or more textured concrete forms used to create concrete "tiles" with the desired surface appearance, generally mimicking the surface appearance of natural stone or other desired pattern. The method involves creating a plurality of cement tiles in the desired shape, pattern, and texture. These cement tiles are most preferably in the range of 1/4"-5/16" thick using a proprietary cementious mixture poured into molds. The concrete used to form the tiles may be colored before it is poured into the form or it may be colored after the concrete has set. After the desired number of concrete tiles have been formed, they may be positioned and fixed in place so as to cover the desired area and create the desired effect for the selected application.

By using the system and method described herein, a homeowner or contractor with no prior concrete experience will be able to achieve a substantially uniform, consistent pattern and texture on every concrete surface. The method involves creating a plurality of cement tiles in the desired shape, pattern, and texture. These cement tiles are most preferably in the range of 1/4"-5/16" thick using a proprietary cementious mixture and custom made rubber molds. The molds are most preferably manufactured from a rubber material.

Figure 1:
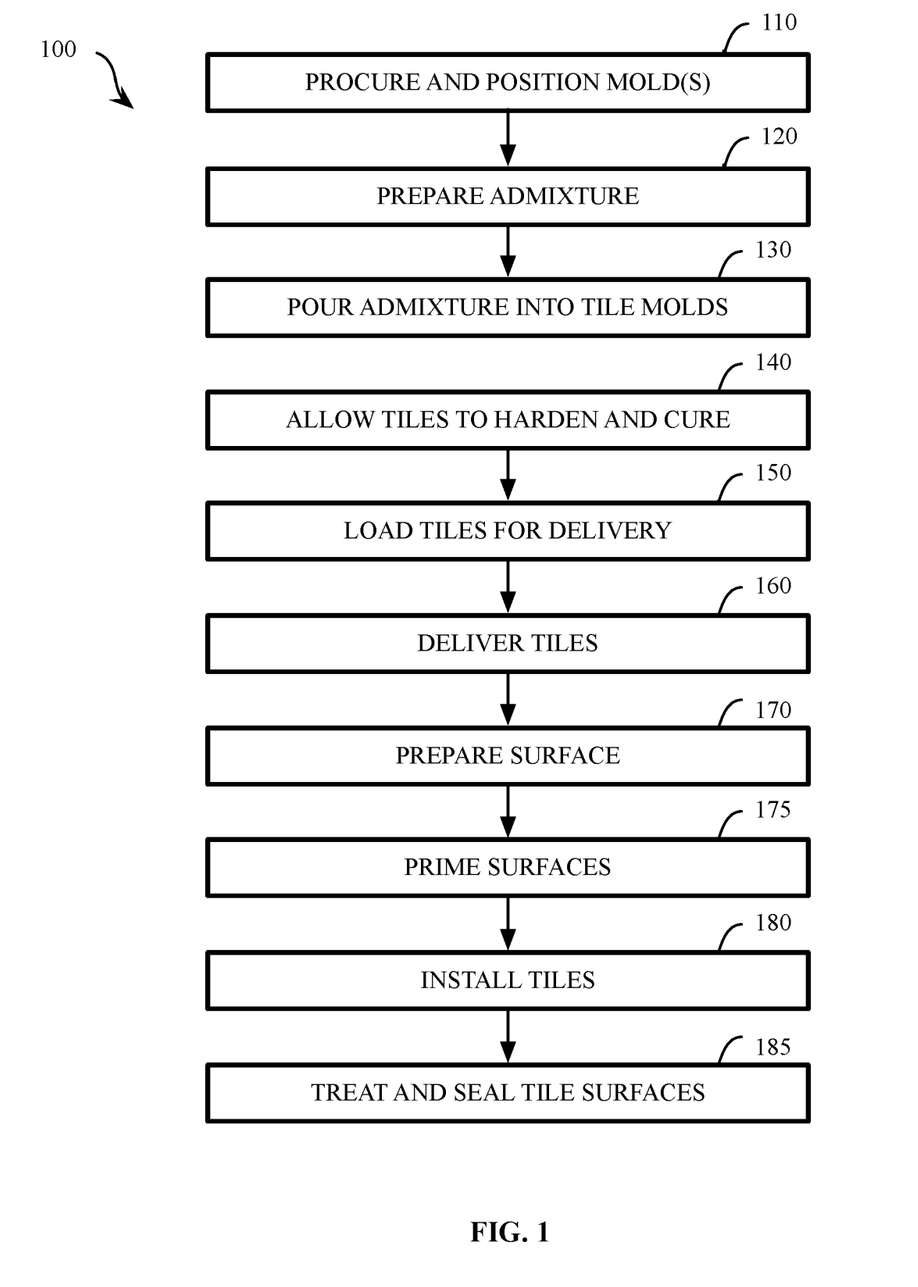
FIG. 1 is a flow chart for a method of creating a textured concrete surface using one or more textured concrete tiles in accordance with a preferred embodiment of the present invention.

Referring now to FIG. 1, a flow chart 100 for a method of creating a textured concrete surface using one or more textured concrete tiles in accordance with a preferred embodiment of the present invention is depicted. As shown in FIG. 1, one or more molds are selected mold may have any type of desired surface pattern, with the surface pattern being selected for the specific application. Multiple molds may be selected with the finished tiles being "mixed and matched" to create the desired effect.

As previously mentioned, the surface pattern of the mold may be designed to mimic the appearance of practically any type of natural stone as well as other types of surfaces. It is important to note that the most preferred embodiments of the present invention comprise a mold that is manufactured from a durable rubber material. Once the desired mold(s) have been procured, the molds can be staged for pouring. The rubber tile molds may be placed on any suitable surface such as a workbench or even a loose piece of 3'×3'×5/8" particleboard. The most important aspect is to ensure that the molds are positioned so as to be stable and relatively flat. This will help to ensure the resultant tiles are relatively flat on the backside (e.g., the non-textured side). This will enable the finished concrete tiles to have a smooth finished surface that will allow the concrete tiles to be placed on a concrete slab or other surface with proper installation techniques. Alternatively, the tiles bay be placed in racks or other vertical storage devices so as to require less overall floor space as the tiles cure or dry.

In at least one preferred embodiment of the present invention, a system of vertical, stacked, roll out shelves may be used. In this embodiment, each shelf will support a mold that can be pulled out from the support structure and the cementitious material will be poured into the mold. Then that shelf will be slid back into the support structure and the next shelf pulled out. This process can be repeated until all of the molds are filled. The tiles will be allowed to dry and then the tiles will be removed from the molds.

With the molds properly positioned in a stable location and on a stable surface, the concrete admixture is prepared (step 120). Any technique known to those skilled in the art may be used to prepare the concrete admixture but a typical process would involve using a container such as a 16-gallon, heavy duty, plastic mixing container and mixing the admixture with a high-powered drill and mixing paddle. The mixing container may be placed on a dolly with wheels before or after mixing to make it easy to move to each mold to be poured. Similarly, a larger mixing vessel with a dedicated mixing paddle or other mixing apparatus may be used for higher quantity production needs.

Next, the admixture can be poured into the rubber molds using any suitable technique, including using a large bucket with approximately 1.5 gallons of admixture being poured into each mold (step 130). In some cases, the admixture will contain harsh chemicals so standard safety procedures should be followed (e.g., wearing a protective breathing mask, rubber gloves, and eye protection, etc.). Using hands or a small trowel, the admixture should be spread to the edges of the mold. The exposed surface can be worked with a trowel until smooth and level with the top edge all the way around the edges of the mold and any excess admixture has been removed.

When the admixture has been poured into the mold, the molds can be gently "shaken" to settle the admixture into the mold, including any nooks and crannies and is substantially level. If necessary, the top surface (e.g., the bottom of the tile once the tile is flipped over for installation) can be smoothed by a trowel or 2×4 to "screed" of any excess admixture. The concrete tile admixture is then allowed to dry and harden (step 140) until the concrete is firm enough to flip the mold over and remove the tile from the mold. It is important to note that drying time can be anywhere from three hours to overnight, depending on the temperature and amount of accelerator used in the admixture. After removing the tiles from the molds, stack the tiles on top of each other in a container on the floor, a pallet, in a box, or on a table or similar surface to allow the tiles to cure for later use.

When the tiles are selected for installation at a specific location, an empty box or pallet can be placed on the bed of a truck, trailer, or wooden pallet, depending on the total weight of the tiles to be transported. For a standard application, each concrete tile is approximately 5/16" thick, between 28"-36" wide, and weighs approximately 15-22 pounds. Those skilled in the art will recognize that other tile sizes may also be produced, depending on the application.

The most preferred embodiments of the present invention further comprise a concrete tile box that will typically hold up to 140 concrete tiles or 2,400 pounds, which, for most applications, will be enough tiles to cover approximately 700 sq. ft.-840 sq. ft. The most preferred embodiments of the present invention utilize a box that is formed from a base portion with one or more removable sides that have been manufactured with latches, allowing one or more of the sides of the box to be selectively removed, thereby leaving an opening to access the interior of the box. Once the tiles have been placed into the box, any removed side(s) can be reinstalled by attaching them to the base, thereby completing the box and securing the decorative tiles for delivery.

To simplify the process, and reduce the amount of work required to load the tiles, the empty tile box can be loaded onto a trailer or bed of a truck using a forklift or by two or available, the tiles can be loaded in the box immediately after removing them from the molds and before loading the box on the truck. This will involve the least amount of handling for the decorative tiles. Additionally, the tiles may be stacked onto a pallet and then lifted into the truck using a forklift. If no forklift is available, the tiles can be stacked in the empty box or onto a pallet after the box or pallet is loaded on the truck or trailer by hand. Once the box is filled to capacity or with the amount of tiles needed for the job, secure the front door back in place using the quick connect latches on the sides of the box and the tiles are ready for delivery (step 150). The tiles are then transported to the job site (step 160).

The installation surface is then cleaned and prepared for installation (step 170) by scrubbing the surface with detergent and pressure washing, and any cracks and joints are filled with a moisture barrier epoxy primer mixed with silica sand. After filling the cracks and joints with the epoxy primer and sand, as part of the priming process (step 175), the entire surface is then rolled with the same moisture barrier epoxy primer without sand mixed in. After rolling the primer, #30 or 20 silica sand is then lightly broadcast over the epoxy while it is still wet to create a sandpaper finish when the epoxy is dry.

The next day, when the primer has dried, the tiles can be installed (step 180). This is accomplished by applying the adhesive to the back of the tiles using a ¼"×⅜"×¼" notched trowel. Lay the tiles over the primed surface and walk on each tile to press it firmly in place. After laying each tile it is desirable to drill holes in the corners between each tile and anywhere else needed within approximately within 15 minutes of tile placement. Then fasteners and washers are installed by drilling holes in the necessary location to press the tiles firmly against the subsurface until the adhesive dries.

This process is continued until the entire surface is covered with tiles that are temporarily screwed in place. The screws and washers are necessary to make the tiles conform to uneven areas of the surface. After the adhesive dries (~16-24 hours) the fasteners and washers can be removed. Optionally, for some applications, it may be desirable to use a conventional concrete stamping method to stamp the edges of steps and to create borders next to the concrete tiles formed by using the concrete tile forming method of the present invention.

Additionally, as part of the installation process, any open gaps or seams between the tiles as well as holes through the face of the tiles can be filled with grout the next day after the screws and washers have been removed. After the grout has hardened and dried, the entire surface can be treated with any desired effects (e.g., colors, antiquing, etc.) and then sealed. After installation and sealing, the tiles should be allowed to cure at least 24 hours before permitting traffic on the installed tiles.

Figure 2:
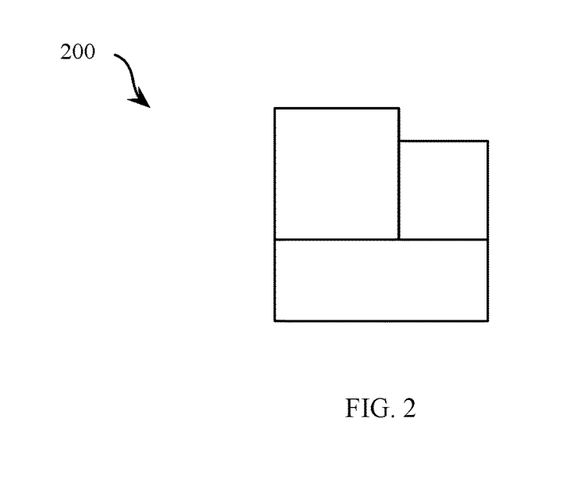
FIG. 2 is a plan view of a textured concrete tile suitable for use in creating a textured concrete surface in accordance with a preferred embodiment of the present invention.

Referring now to FIG. 2, a textured concrete tile 200 suitable for use in creating a textured concrete surface in accordance with a preferred embodiment of the present invention is depicted. Concrete tile 200 was formed using method 100 of FIG. 1. As shown in FIG. 2, concrete tile 200 has a substantially rectangular shape and includes several lines that serve to break up the pattern on the surface of concrete tile 200. As previously mentioned, the surface of concrete tile 200 may have various 3-dimensional surficial patterns formed in the surface of concrete tile 200, depending on the mold selected for use. The surface of concrete tile 200 may be formed so as to represent any type of natural stone or other material.

Figure 3:
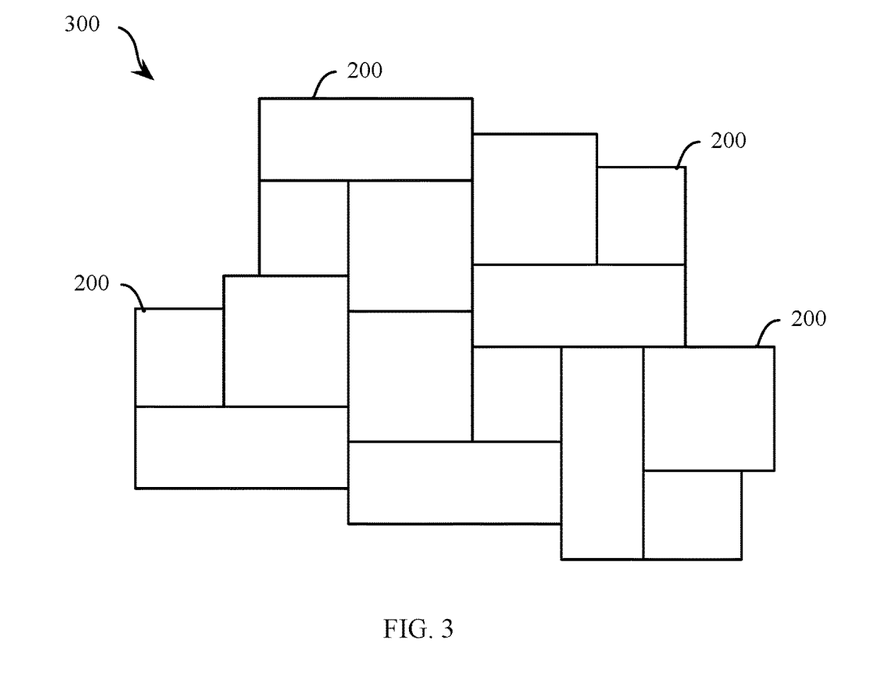
FIG. 3 is a plan view of a group of textured concrete tiles arranged to create a textured concrete surface in accordance with a preferred embodiment of the present invention.

Referring now to FIG. 3, a plan view of a plurality of textured concrete tiles 200 have been arranged to create a textured concrete surface 300 in accordance with a preferred embodiment of the present invention a plurality of concrete tiles 200 have been arranged, positioned, and cemented in place so as to form textured concrete surface 300.

Figure 4:
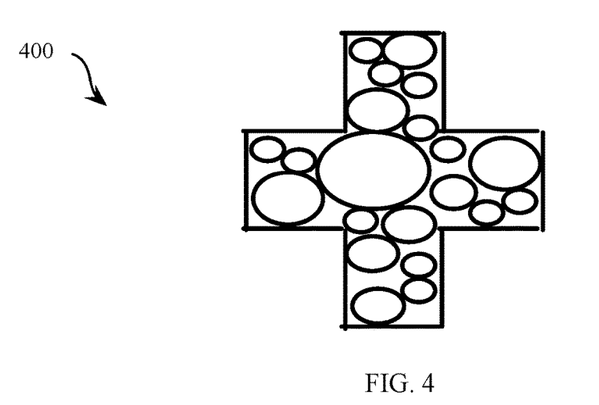
FIG. 4 is a plan view of a textured concrete tile suitable for use in creating a textured concrete surface in accordance with a preferred embodiment of the present invention.

Referring now to FIG. 4, a textured concrete tile 400 suitable for use in creating a textured concrete surface in accordance with a preferred embodiment of the present invention is depicted. Concrete tile 400 was formed using method 100 of FIG. 1. As shown in FIG. 4, concrete tile 400 has an irregular shape and includes several different sizes and styles of patterns formed on the surface of concrete tile 400 that serve to break up the pattern on the surface of concrete tile 400. As previously mentioned, the surface of concrete tile 400 may have various 3-dimensional surficial patterns formed in the surface of concrete tile 400, depending on the mold selected for use. The surface of concrete tile 400 may be formed so as to represent any type of natural stone or other material.

Figure 5:
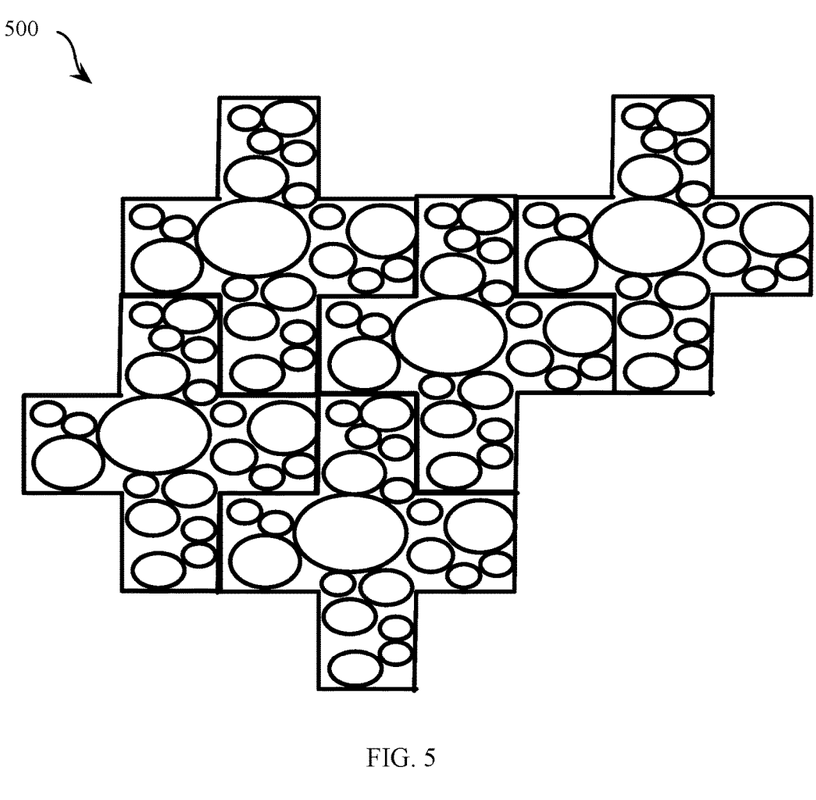
FIG. 5 is a plan view of a group of textured concrete tiles arranged to create a textured concrete surface in accordance with a preferred embodiment of the present invention.

Referring now to FIG. 5, a plan view of a plurality of textured concrete tiles 400 have been arranged to create a textured concrete surface 500 in accordance with a preferred embodiment of the present invention a plurality of concrete tiles 400 have been arranged, positioned, and cemented in place so as to form textured concrete surface 500.

In summary, there are a series of components used in the current system and method. The names for each product in the system are: i) precast molds, typically formed from urethane rubber with a variety of different shapes and textures for casting cementitious tiles; ii) an admixture used to create the cementitious substance that is poured into the rubber molds to create the actual concrete tile; iii) and the tiles that are created by the system, where one or more tiles are placed on a surface.

For covering an area of approximately 40 square feet, the admixture would most preferably comprise (in approximate amounts and quantities) 13 lbs. of rapid set cement (e.g., fast setting hydraulic cement); 8 oz. of a powder water reducer (e.g., Melment F10); pigment (e.g., 1 oz. #677 Davis colors pigment) to add a desired color to the finished tile; 0.75 lbs. of powder polymer, most preferably made with vinyl ethylene acetate; 1.5 lbs. of AR (alkali resistant) glass fiber (13h-350y) with a diameter in the range of approximately 13 mm. These components are mixed with approximately 47 lbs. of Portland cement (type I/II or II/IV) with approximately 50 lbs. of #30 silica sand and approximately 2.75 gallons of water. This mixture will produce a tile that is substantially more flexible than tile produced by conventional methods, allowing the tile to be flexed into position as described herein.

The molds used in the method described above may be manufactured using many different methods. For purposes of illustration, the following method is described. A pattern for a form to create one or more molds may be started by cutting the desired shape from a relatively lightweight and stable substance such as Melamine. Those skilled in the art will recognize that the many other substances (e.g., plywood, MDF, etc.) may be used.

Then the desired grout lines can be drawn onto the pattern to identify or define the shape of each stone or tile within the pattern. The examples in FIG. 2 and FIG. 4 are illustrations of this and particularly FIG. 4 where the molds for the tiles are formed with a stone-like texture being formed in the tile. Once the shapes for each stone have been desired textures. With the desired stone textures identified, molten clay is then poured over the textures of natural stones and, after cooling, the clay is cut to match the shapes of the stones selected for the tile forms. The cut and textured clay pieces are placed on the melamine board and more clay is used to simulate grout lines in between each stone shape. Next, melamine side panels are formed around edge of the pattern to form an enclosed box around the clay forms.

With the form being substantially complete, the surface of the clay is brushed with a release agent and a two-part urethane rubber is poured over the clay to a depth of approximately one inch. The rubber used is most preferably a rubber substance that yields a relatively flexible result when cured, meaning that the finished rubber mold will be rather easy to bend in half. Next, the finished rubber mold is placed into a stable box with approximately a 1" border going around the edges to be used as a master mold. The master mold is used to create additional molds or tiles.

Once the molds have been completed, the tiles can be formed by pouring the liquid cementitious material into the mold. The top of the tile can be made smooth by shaking or vibrating the mold to help the tile mix self-level on top, or a concrete trowel can be used to smooth the back surface of the tile. After approximately 30 minutes of curing the back surface can also be "broomed" to leave a textured finish for the adhesive to grab onto when laying the tiles. After the material for the tile has set up, and the tile is removed from the mold, the tiles can be stacked on top of each other until ready for installation. In general, a moisture barrier epoxy primer is rolled over the concrete or surface to be covered with tiles. After the primer dries, a cement adhesive mix is applied to the back of each tile using a notched trowel or some other readily recognized method.

Immediately after applying the adhesive to the back of the tile the tile can then be placed over the cured epoxy and sand that was applied over the surface the day before where the tiles are to be laid. With the tiles in place, it is necessary to stand on the tiles to press the adhesive firmly against the surface. It is also desirable to drill holes in the face of the tile where needed and to screw the tiles against the surface using concrete screws and washers shortly after laying the tiles and before the adhesive begins to dry. This process is repeated one tile at a time with the tiles being placed on the surface with the pieces being fit together like a puzzle until the whole surface is covered with tiles. After the adhesive has properly dried or cured, the screws are removed and the tiles are grouted, colored, antiqued, and sealed.

If necessary, the edges or other areas of the tile may be secured in place using washers and fasteners to ensure that the surface of the tile contacts the adhesive. That process is repeated one tile at a time with the tiles being placed on the surface with the pieces being fit together like a puzzle until the whole surface is covered with tiles. Using fasteners and washers also presses the tiles down against the surface to make them bend and conform to low spots or uneven areas of the surface. In this fashion, the fasteners and washers will minimize the presence of voids and hollow spots when the adhesive dries.

Once the tiles have been placed and the adhesive has dried, the washers and screws can be removed from the tiles and from the gaps between the tiles. Then the holes grouted as well, using the same admixture that was used to form the tiles. Finally, the surface of the tiles may be coated with various materials to add color, texture, acid stains, antiquing, etc. and the entire surface can be sealed as well with one or more coats to finalize the installation.

Figure 6:
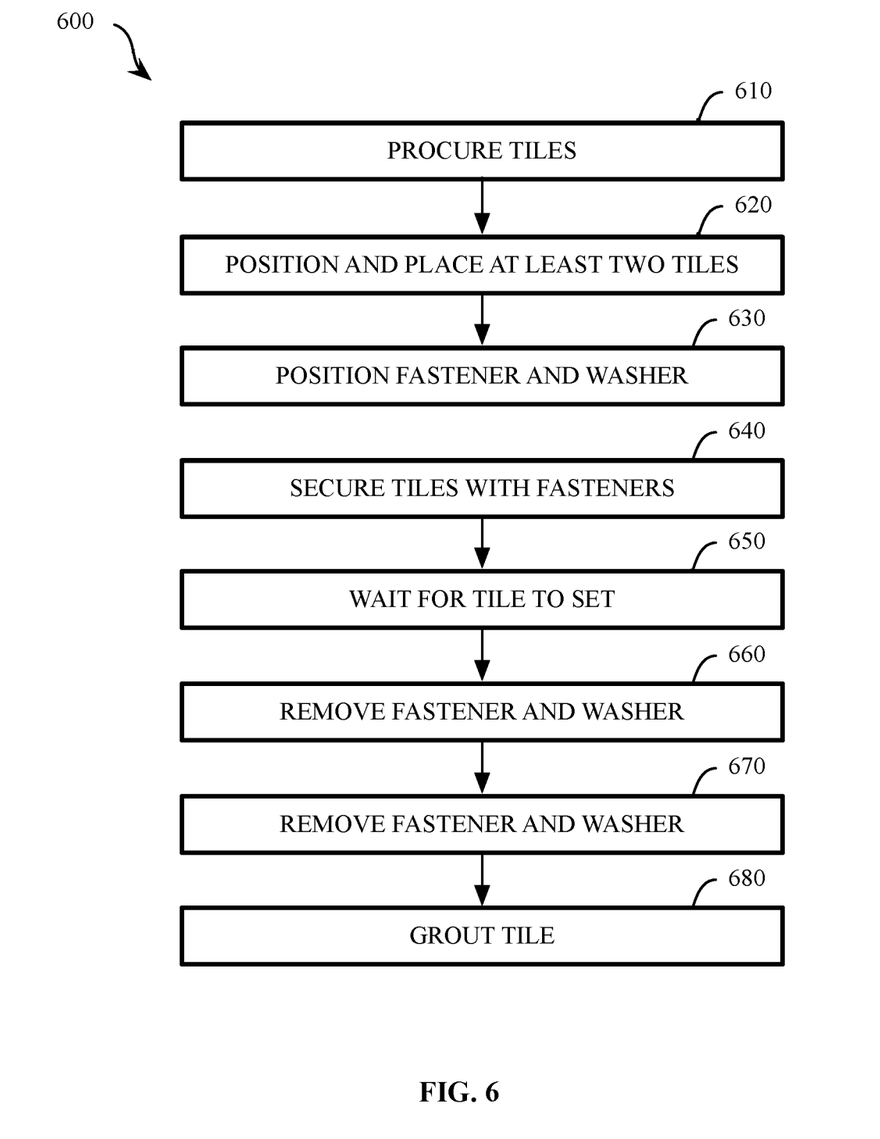
FIG. 6 is a flow chart for a method for installing tiles in accordance with a preferred embodiment of the present invention.

Referring now to FIG. 6, a flow chart for a method 600 for installing tiles in accordance with a preferred embodiment of the present invention is depicted. As shown in FIG. 6, tiles may be procured for installation (step 610) and two or more tiles will be positioned and placed in the desired location (step 620), including the application of cement or other adhesive to the back of the tiles. With the tiles in the desired location, a fastener and a washer may be positioned (step 630 and step 640) so as to allow the fastener to be inserted into the interstitial space or gap between adjacent tiles or into the face of the tile in another location as necessary to ensure the proper connection with the surface supporting the tiles.

In the most preferred embodiments of the present invention, multiple fasteners and washers are positioned and inserted so as to securely hold each tile in place and to ensure that the edges of adjacent tiles are relatively flush with each other to create a relatively smooth surface. With the tiles and fasteners properly in place, the tiles will not move or shift and the edges will remain in alignment until the grout or other adhesive material has dried or cured.

Once the grout or other material has sufficiently dried or cured, the fastener and washer may be removed (step 660) and grout or other material can be used to fill the interstitial space or gap between the tiles (step 670 and step 680).

Figure 7:
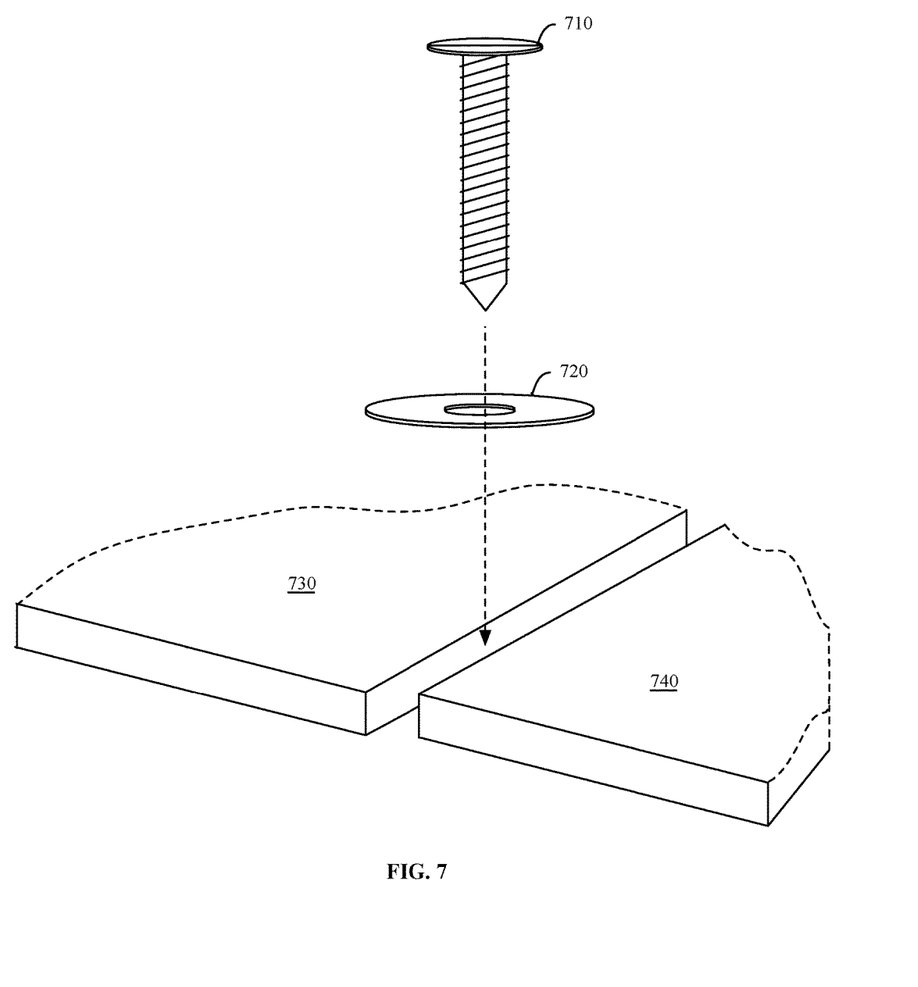
FIG. 7 is a perspective view of using a fastener and a washer for installing tile in accordance with a preferred embodiment of the present invention.

Referring now to FIG. 7, a perspective view of using a fastener and a washer for installing tile in accordance with a preferred embodiment of the present invention is depicted. As shown in FIG. 7, the shaft of a fastener 710 is inserted through an aperture in washer 720. Fastener 710 is then inserted into the interstitial space or gap between tile 730 and tile 740. By screwing or hammering fastener 710 into a substrate below tile 730 and tile 740, washer 720 can be positioned so as to hold tile 730 and tile 740 firmly in place, while also providing for a way to ensure that the edges and corners of tile 730 and tile 740 are flush.

Since even cement tiles have some amount of "give" in them, it is possible to apply sufficient force to gently bend tile 730 and tile 740 enough to ensure proper edge alignment. Obviously, over-torqueing fastener 710 could result in breakage so care should be exercised.

Fastener 710 is any type of fastener suitable for use in this application. Nails, screws, etc. may be used and the material used to manufacture fastener 710 may be selected so as to provide the proper structural characteristics. Plastic and metal are excellent choices, as are other relatively strong and durable materials. Washer 720 is any type of washer suitable for use in the application and may be manufactured from the same or similar materials as fastener 710.

Figure 8:
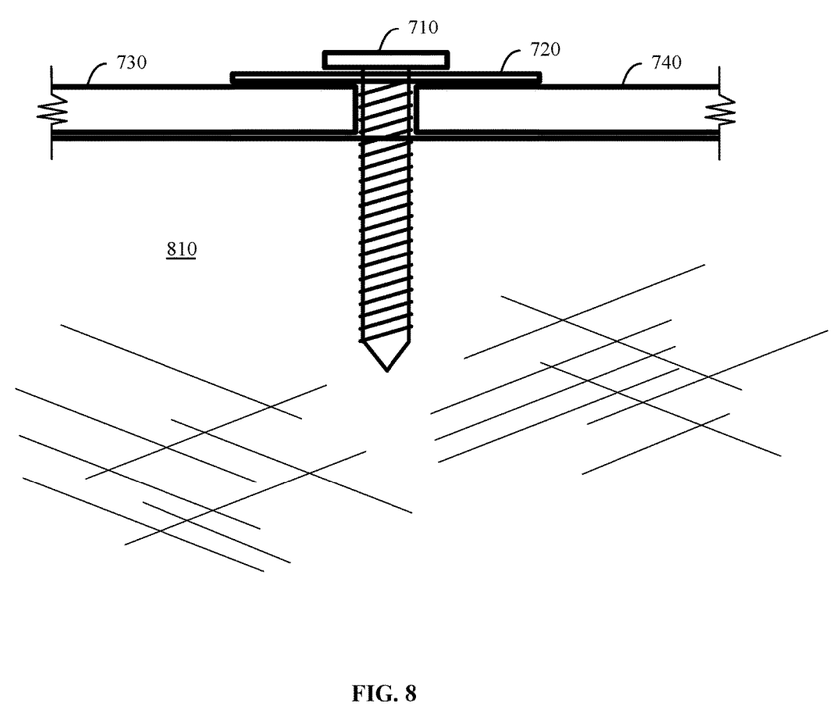
FIG. 8 is a side view of a fastener and a washer positioned to secure at least two tiles in accordance with a preferred embodiment of the present invention.

Referring now to FIG. 8, a perspective view of using a fastener and a washer for installing tile in accordance with a preferred embodiment of the present invention is depicted. As shown in FIG. 8, fastener 710 has been fully inserted through the aperture in washer 720, into the interstitial space or gap between tile 730 and tile 740, and secured into substrate 810. With fastener securely fastened in position, tile 730 and tile 740 are held firmly in place while any adhesive used to affix tile 730 and tile 740 to substrate 810 dries or cures.

From the foregoing description, it should be appreciated that the system and method for using fasteners and washers to securely position and press tiles in place to reduce or eliminate voids during the installation process is an improvement over previously methods of tile installation. Additionally, the method of creating decorative concrete surfaces presents significant benefits that would be apparent to one skilled in the art. Furthermore, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient framework for implementing a preferred exemplary embodiment of the invention. It should be understood that various changes may be made in the function and arrangement of elements described in the exemplary preferred embodiment without departing from the spirit and scope of the invention as set forth in the appended claims.

The invention claimed is:

1. A method of creating a decorative design for a surface comprising the steps of:
  a) forming a plurality of decorative cementitious tiles;
  b) placing at least one of the plurality of decorative cementitious tiles in a desired location; and
  c) securing the at least one of the plurality of decorative cementitious tiles to the surface by inserting a fastener through a washer and inserting the fastener into at least one of: a hole formed in the face of the at least one of the plurality of decorative cementitious tiles; and an interstitial gap between the at least one of the plurality of decorative cementitious tiles and a second decorative cementitious tile; and
  d) anchoring the fastener into the surface beneath the at least one of the plurality of decorative cementitious tiles;
  wherein the plurality of cementitious tiles are formed using a rubber mold wherein the rubber mold is manufactured by a process comprising the steps of:
  creating a tile pattern from a substantially flat lightweight material;
  drawing a series of grout lines on the pattern, thereby defining a plurality of desired shapes;
  locating at least one object with a desired texture:
  pouring molten clay over the at least one object;
  allowing the molten clay to harden, creating at least one hardened clay object;
  cutting the at least one hardened clay object to match the plurality of desired shapes;
  affixing the at least one hardened clay object to a surface of the tile pattern, thereby creating a patterned surface;
  affixing sides to the tile pattern, thereby forming a box;
  brushing the patterned surface with a release agent;
  pouring a liquid rubber over the clay;
  allowing the liquid rubber to cure; and
  removing the rubber mold from the box.

2. The method of claim 1 further comprising a pigment added to the admixture prior to the step of pouring the cementitious admixture into the at least one rubber mold.

3. The method of claim 1 wherein the plurality of cementitious tiles are manufactured using an admixture comprising:
  a portion of fast setting hydraulic cement;
  a powdered water reducer;
  a powdered polymer made with vinyl ethylene acetate;
  a plurality of alkali resistant glass fibers;
  a portion of PORTLAND CEMENT;
  a portion of silica sand; and
  a portion of water.

4. The method of claim 1 wherein the plurality of cementitious tiles are manufactured using an admixture comprising:
  13 pounds of fast setting hydraulic cement;
  8 ounces of powdered water reducer;
  0.75 pounds of powdered polymer made with vinyl ethylene acetate;
  1.5 pounds of alkali resistant glass fibers, each of said alkali resistant glass fibers comprising a diameter of approximately 13 mm;
  47 pounds of PORTLAND CEMENT;
  50 pounds of #30 silica sand; and
  2.75 gallons of water.

5. The method of claim 1 further comprising the steps of repeating steps b-d to cover the surface with the plurality of decorative cementitious tiles.

6. The method of claim 1 wherein each of the plurality of decorative cementitious tiles comprises a textured surface resembling at least one of: a brick surface; a slate surface; a flagstone surface; a stone surface; a tile surface; and a wood surface.

7. The method of claim 1 wherein at least a portion of the plurality of decorative cementitious tiles are pressed into contact with an uneven portion of the surface as a result of pressure exerted on the at least a portion of the plurality of cementitious tiles by a plurality of washers and fasteners.

8. The method of claim 1 wherein the step of securing the at least one of the plurality of decorative cementitious tiles to the surface by inserting a fastener through a washer and inserting the fastener into at least one of: a hole formed in the face of the at least one of the plurality of decorative cementitious tiles; and an interstitial gap between the at least one of the plurality of decorative cementitious tiles and a second decorative cementitious tile creates a deformation of the at least one of the plurality of decorative cementitious tiles, thereby conforming the at least one of the plurality of decorative cementitious tiles to an uneven portion of the surface.

* * * * *